US012626004B2

(12) United States Patent
Yang

(10) Patent No.: US 12,626,004 B2
(45) Date of Patent: May 12, 2026

(54) PROCESSING QUERY PREDICATES INVOLVING FINE-GRAINED PRIVACY-PRESERVING COLUMNS

(71) Applicant: Beijing Volcano Engine Technology Co., Ltd., Beijing (CN)

(72) Inventor: Xinying Yang, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 78 days.

(21) Appl. No.: 18/823,610

(22) Filed: Sep. 3, 2024

(65) Prior Publication Data
US 2026/0064875 A1 Mar. 5, 2026

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 2221/2141* (2013.01)

(58) Field of Classification Search
CPC .............. G06F 21/6227; G06F 21/604; G06F 2221/2141
See application file for complete search history.

(56) References Cited

U.S. PATENT DOCUMENTS

| | | | | |
|---|---|---|---|---|
| 5,778,354 A * | 7/1998 | Leslie | ................. | G06F 16/2228 707/715 |
| 7,243,097 B1 * | 7/2007 | Agrawal | ............. | G06F 16/2452 |
| 7,263,512 B2 * | 8/2007 | McGoveran | .......... | G06F 16/284 707/999.102 |
| 7,958,150 B2 * | 6/2011 | Bird | .................. | G06F 16/24534 707/785 |
| 11,163,904 B2 * | 11/2021 | Barbas | .............. | G06F 16/24564 |

* cited by examiner

*Primary Examiner* — Han Yang
(74) *Attorney, Agent, or Firm* — BakerHostetler

(57) ABSTRACT

The present disclosure describes techniques for processing query predicates involving fine-grained privacy-preserving columns. A query predicate is received. It is determined whether there is a first match between identification information and operator information in a first row of a predicate catalog table and information associated with the query predicate. It is determined whether a value of a quantity limit in the first row is greater than zero in response to determining that there is the first match between the identification information and the operator information in the first row and the information associated with the query predicate. The query predicate is executed in response to determining that the value of the quantity limit in the first row is greater than zero. The value of the quantity limit in the first row is automatically reduced by one and the predicate catalog table is automatically updated.

20 Claims, 14 Drawing Sheets

200

301

| EnCollID | Owner | Predicate Survivor | Operators | Runs | Interval |
|----------|-------|--------------------|-----------|------|----------|
| uid1 | user1 | user2 | = | 100 | 1 |

402

Run "=" query and automatically reduce quantity limit

301

| EnCollID | Owner | Predicate Survivor | Operators | Runs | Interval |
|----------|-------|--------------------|-----------|------|----------|
| uid1 | user1 | user2 | = | 99 | 1 |

| EnColID | Owner | Predicate Survivor | Operators | Runs | Interval |
|---------|-------|--------------------|-----------|------|----------|
| uid1 | user1 | user2 | = | 100 | 1 |
| uid1 | user1 | user2 | null | 5 | 1 |

402   502

Run ">" query and automatically reduce quantity limit

301

| EnColID | Owner | Predicate Survivor | Operators | Runs | Interval |
|---------|-------|--------------------|-----------|------|----------|
| uid1 | user1 | user2 | = | 100 | 1 |
| uid1 | user1 | user2 | null | 4 | 1 |

| EnColID | Owner | Predicate Survivor | Operators | Runs | Interval |
|---------|-------|--------------------|-----------|------|----------|
| uid1 | user1 | user2 | = | 50 | null |

301
602

User runs 50 "="
queries

| EnColID | Owner | Predicate Survivor | Operators | Runs | Interval |
|---------|-------|--------------------|-----------|------|----------|
| uid1 | user1 | user2 | = | 0 | null |

301
602

Delete row

| EnColID | Owner | Predicate Survivor | Operators | Runs | Interval |
|---------|-------|--------------------|-----------|------|----------|

| EnColID | Owner | Predicate Survivor | Operators | Runs | Interval |
|---------|-------|--------------------|-----------|------|----------|
| uid1 | user1 | user2 | = | 30 | 1 |

User runs 30 (<) queries →

| EnColID | Owner | Predicate Survivor | Operators | Runs | Interval |
|---------|-------|--------------------|-----------|------|----------|
| uid1 | user1 | user2 | = | 0 | 1 |

Reset runs to 30 every interval →

| EnColID | Owner | Predicate Survivor | Operators | Runs | Interval |
|---------|-------|--------------------|-----------|------|----------|
| uid1 | user1 | user2 | = | 30 | 1 |

FIG. 7

800

Receive a query predicate containing a fine-grained privacy-preserving column, wherein the fine-grained privacy-preserving column contains secret information 802

Search a predicate catalog table and determining whether there is a first match between identification information and operator information in a first row of the predicate catalog table and information associated with the query predicate, wherein each row of the predicate catalog table comprises identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset 804

Determine whether a value of a quantity limit in the first row is greater than zero in response to determining that there is the first match between the identification information and the operator information in the first row and the information associated with the query predicate 806

Execute the query predicate in response to determining that the value of the quantity limit in the first row is greater than zero 808

Automatically reduce the value of the quantity limit in the first row by one and automatically updating the predicate catalog table 810

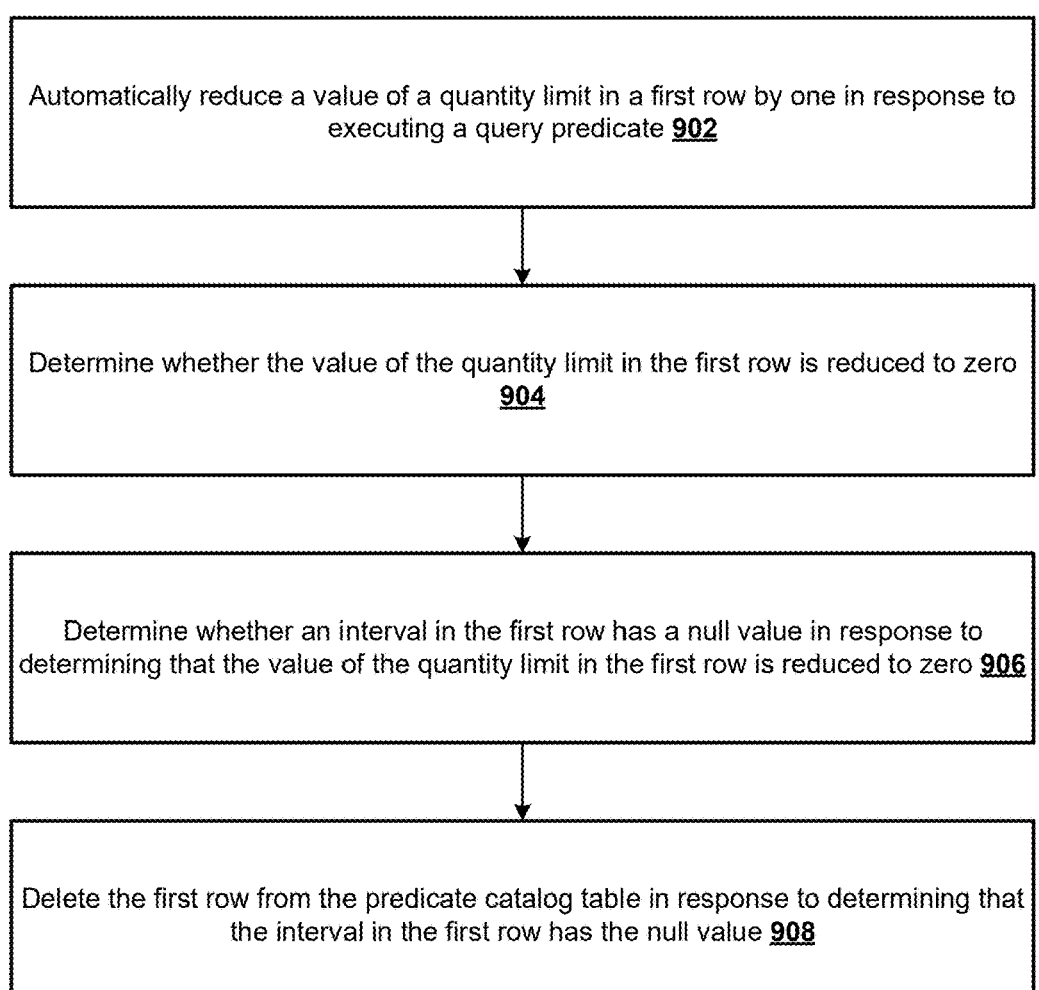

Automatically reduce a value of a quantity limit in a first row by one in response to executing a query predicate 902

Determine whether the value of the quantity limit in the first row is reduced to zero 904

Determine whether an interval in the first row has a null value in response to determining that the value of the quantity limit in the first row is reduced to zero 906

Delete the first row from the predicate catalog table in response to determining that the interval in the first row has the null value 908

FIG. 9

1000

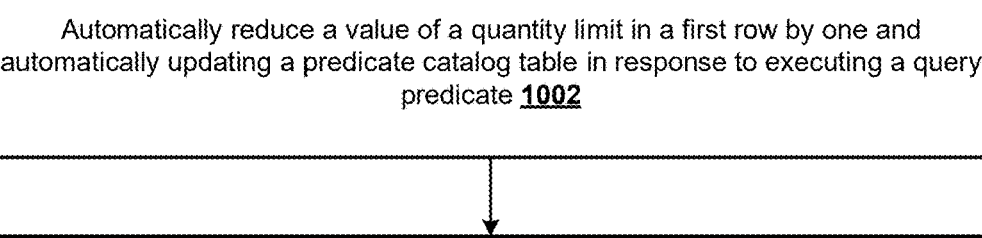

Automatically reduce a value of a quantity limit in a first row by one and automatically updating a predicate catalog table in response to executing a query predicate 1002

Determine whether the value of the quantity limit in the first row is reduced to zero 1004

Determine whether an interval in the first row has a null value in response to determining that the value of the quantity limit in the first row is reduced to zero 1006

Automatically reset the quantity limit in the first row at every interval in response to determining that the interval in the first row has a non-null value 1008

Receive a query predicate containing a fine-grained privacy-preserving column, wherein the fine-grained privacy-preserving column contains secret information
1102

Determine whether a value of a quantity limit in a first row is equal to zero in response to determining that there is a first match between identification information and operator information in the first row and information associated with the query predicate, wherein the interval in the first row has a non-null value 1104

Refrain from executing the query predicate in response to determining that the value of the quantity limit in the first row is equal to zero 1106

Cause output of an error message indicating that the query predicate is not allowed
1108

Receive a query predicate containing a fine-grained privacy-preserving column and a specific predicate operator, wherein the fine-grained privacy-preserving column contains secret information 1202

Determine whether there is a second match between identification information in a second row of the predicate catalog table and information associated with the query predicate 1204

Determine whether operation information in the second row covers a plurality of predicate operators including the specific predicate operator in response to determining there is the second match between the identification information in the second row and the information associated with the query predicate 1206

Execute the query predicate in response to determining that the operation information in the second row covers the specific predicate operator and determining that a value of a quantity limit in the second row is greater than zero 1208

Automatically reduce the value of the quantity limit in the second row by one 1210

Receive a query predicate containing a fine-grained privacy-preserving column, wherein the fine-grained privacy-preserving column contains secret information 1302

Determine whether there is a first match between identification information and operator information in the first row and information associated with the query predicate 1304

Determine whether there is a second match between identification information in a second row of the predicate catalog table and the information associated with the query predicate in response to determining the first match is not identified 1306

Refrain from executing the query predicate in response to determining that neither the first match nor the second match is identified 1308

Cause output of an error message indicating that the query predicate is not allowed 1310

FIG. 13

PROCESSING QUERY PREDICATES INVOLVING FINE-GRAINED PRIVACY-PRESERVING COLUMNS

BACKGROUND

Certain data may be sensitive or confidential. Permission to such data may be restricted to a particular set of parties. For example, sensitive or confidential data may be encrypted so that only authorized parties can access it. As the quantity of sensitive or confidential data continues to increase, people continue to desire new ways for managing access to data.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example predicate catalog table in accordance with the present disclosure.

FIG. 5 shows an example predicate catalog table in accordance with the present disclosure.

FIG. 6 shows an example predicate catalog table in accordance with the present disclosure.

FIG. 7 shows an example predicate catalog table in accordance with the present disclosure.

FIG. 8 shows an example process for processing query predicates involving fine-grained privacy-preserving columns in accordance with the present disclosure.

FIG. 9 shows an example process for processing query predicates involving fine-grained privacy-preserving columns in accordance with the present disclosure.

FIG. 10 shows an example process for processing query predicates involving fine-grained privacy-preserving columns in accordance with the present disclosure.

FIG. 11 shows an example process for processing query predicates involving fine-grained privacy-preserving columns in accordance with the present disclosure.

FIG. 12 shows an example process for processing query predicates involving fine-grained privacy-preserving columns in accordance with the present disclosure.

FIG. 13 shows an example process for processing query predicates involving fine-grained privacy-preserving columns in accordance with the present disclosure.

DETAILED DESCRIPTION OF ILLUSTRATIVE EMBODIMENTS

An in-enclave (e.g., fully hardware encrypted) relational database that supports privacy-preserving and verifiable functionalities can be implemented by residing an entire database management system (DBMS) in a hardware-based security engine that isolates and protects data in use against attack within a virtual machine (VM). In this fully hardware encrypted database architecture, all memory, central processing unit(s), and input/output (I/O) security can be protected from data leaks. Thus, any DBMS internally used data structures and data stores that do not have explicit retrieval interfaces cannot be viewed by adversaries, such as system and physical logs.

When creating or altering a table in this hardware encrypted database architecture, a privacy-preserving column can be defined with an additional keyword "SECRET." The owner of the secret column can see the plaintext. Other users cannot observe the plaintext in any way, such as for data retrieval, predicate handling, log probing, or statistic viewing. The owner can execute data control language (DCL) operations to grant column visibility to another user (e.g., using the command "GRANT VIEWER DCL") and to remove or revoke visibility control from a user (e.g., using a "DENY" or "REVOKE" command). These DCL operations can be only executed by the secret column owner to prevent unexpected operations from high-privileged roles such as database administrators (DBAs).

An owner of a privacy-preserving column can control visibility of a privacy-preserving column by granting viewing access to, denying viewing access from, or revoking viewing access from another user (e.g., using a GRANT, DENY, or REVOKE command, respectively). If a user that has not been granted viewing access to a privacy-preserving column attempts to executes a DML command with a predicate that contains the privacy-preserving column, an error is returned. The owner of a privacy-preserving column may want to enable a user that is not a viewer of the privacy-preserving column to have limited access (e.g., predicate access) to the secret information in the privacy-preserving column. To enable the user to have predicate access to the secret information in the privacy-preserving column, the owner can grant the user predicate access to the privacy-preserving column (e.g., using a GRANT command). The owner can specify one or more predicate operators that the user can run, a quantity of times the user can run a query containing the predicate operator(s), and a time interval after which the quantity of times the user can run a query containing the predicate operator(s) can be reset.

Figure 1:
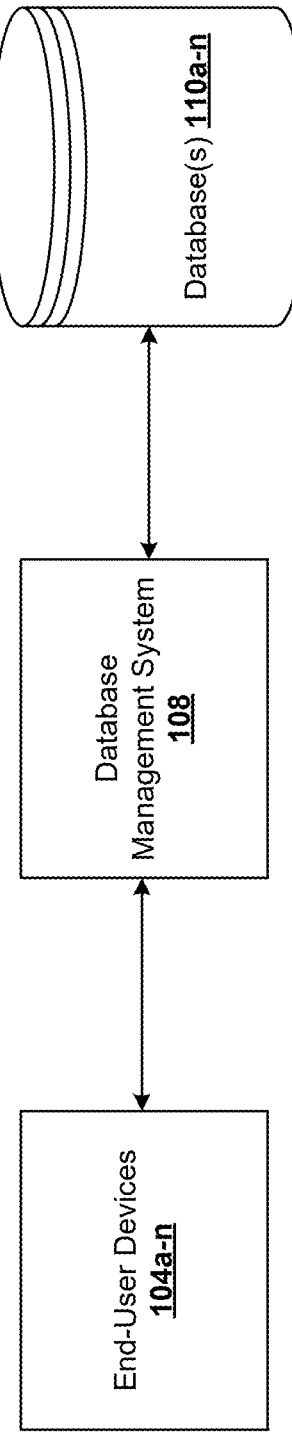
FIG. 1 shows an example system for processing query predicates involving fine-grained privacy-preserving columns in accordance with the present disclosure.

Described here are improved techniques for processing query predicates containing fine-grained privacy-preserving columns. FIG. 1 shows an example system 100 for processing query predicates involving fine-grained privacy-preserving columns in accordance with the present disclosure. The system 100 includes a plurality of end user devices 104*a-n*, a DBMS 108, and at least one database 110.

The at least one database 110 can store data, such as in the form of one or more tables. Each of the table(s) can include one or more fine-grained privacy-preserving columns. Each fine-grained privacy-preserving column can include secret information. Each fine-grained privacy-preserving column can be defined with the additional keyword "SECRET." Only an owner of a particular fine-grained privacy-preserving column can be allowed to execute DCL operations associated with that fine-grained privacy-preserving column. The owner of the particular fine-grained privacy-preserving column can be associated with one or more of the plurality of end user devices 104*a-n*. Only the one or more end user devices associated with the owner can be used to execute DCL operations associated with that fine-grained privacy-preserving column.

The DBMS 108 can create a predicate catalog table. The predicate catalog table can be configured for controlling predicate survivor users' access the fine-grained privacy-preserving columns. Each of the predicate survivor users can be granted access to query at least one of the fine-grained privacy-preserving columns using at least one predicate operator. The at least one predicate operator can include, one or more of the following operators: = (e.g., equal to), > (e.g., greater than), < (e.g., less than), ≤ (e.g., less than or equal to), ≥ (e.g., greater than or equal to), "not in," "between," and/or any other operator. In some embodiments, a predicate survivor user can be granted access to query at least one of the fine-grained privacy-preserving columns using any predicate operator (e.g., when operation information in a row of the predicate catalog table has a "null" value).

Each row of the predicate catalog table can include identification information. The identification information in each row of predicate catalog table can include identification information of the particular fine-grained privacy-preserving column, identification information of an owner of the particular fine-grained privacy-preserving column, and identification information of the particular predicate survivor user. Each row of the predicate catalog table can include operator information. The operator information can indicate the one or more predicate operators that the predicate survivor user can use to query the fine-grained privacy-preserving column. Each row of the predicate catalog table can include control information for controlling a particular predicate survivor user's access to a particular fine-grained privacy-preserving column. The control information in each row of the predicate catalog table can include information indicating a quantity limit that the particular predicate survivor user is allowed to query the particular fine-grained privacy-preserving column using the one or more predicate operators (e.g., a quantity of times that the predicate survivor user is allowed to query the particular fine-grained privacy-preserving column using the one or more predicate operators). The control information in each row of the predicate catalog table can include information indicating an interval at which the quantity limit is to be reset (e.g., a time interval after which the quantity of times the user can run a query containing the predicate operator(s) is to be reset).

A user can be granted predicate access to one of the fine-grained privacy-preserving columns in response to receiving an instruction from an owner of the fine-grained privacy-preserving column. The instruction can be associated with identification information of the owner. The owner can be associated with a first end user device 104a among the plurality of end user devices 104a-n. The instruction can be received from the first end user device 104a. The owner of the fine-grained privacy-preserving column is the only user that has permission to execute DCL operations associated with the fine-grained privacy-preserving column.

The instruction can include identification information, such as identification information of the particular fine-grained privacy-preserving column, and identification information of the user to which the owner wants to grant predicate access. The instruction can include operator information indicating one or more predicate operators that the user to which predicate access is being granted can use to query the fine-grained privacy-preserving column. The instruction can include control information indicating a quantity limit that the user is allowed to query the particular fine-grained privacy-preserving column using the one or more predicate operators (e.g., a quantity of times that the user is allowed to query the particular fine-grained privacy-preserving column using the one or more predicate operators). The control information in the instruction can indicate an interval at which the quantity limit is to be reset (e.g., a time interval after which the quantity of times the user can run a query containing the predicate operator(s) is to be reset).

It can be determined if any row in the predicate catalog table matches the instruction based on comparing the identification information and the operator information in each existing row of the predicate catalog table with information associated with the instruction. An existing row in the predicate catalog table can match the instruction if the existing row includes the same identification information and operator information as the identification information and operator information indicated by (e.g., associated with, included in) the first instruction.

In embodiments, no match exists between any existing row in the predicate catalog table and the instruction. It can be determined that no match exists between any existing row in the predicate catalog table and the instruction if the predicate catalog table does not include any row that includes the same identification information and operator information as the identification information and operator information indicated by the instruction. In response to determining that there is no match, the DBMS 108 can create a new row in the predicate catalog table. The new row can be created based on the instruction. For example, the new row can be created based on the identification information, the operator information, and the control information indicated by the instruction. The new row can be configured to control the user's predicate access to the fine-grained privacy-preserving column.

In other embodiments, a match exists between an existing row in the predicate catalog table and the instruction. It can be determined that a match exists between the existing row in the predicate catalog table and the instruction if the predicate catalog table includes an existing row that includes the same identification information and operator information as the identification information and operator information indicated by the instruction. In response to determining that there is a match, the DBMS 108 can update the control information in the existing row of the predicate catalog table based on the instruction. For example, the control information in the existing row of the predicate catalog table can be replaced with the control information indicated by the instruction.

In embodiments, a row in the predicate catalog table can include control information that indicates a quantity limit that a particular predicate survivor user is allowed to query a particular fine-grained privacy-preserving column using one or more specified predicate operators, and an interval having a number value. The number value can be indicative of any time period (e.g., one day, two days, one week, one month, etc.) If the interval in a row has a number value, this indicates that the quantity limit in that row is to be reset when the time period expires or has lapsed. The DBMS 108 can reset the quantity limit in the row at every interval in response to determining that the interval in the new row has a number (e.g., non-null) value, regardless of whether or not the number of queries executed by the particular predicate survivor user has reached the quantity limit.

The DBMS 108 can receive a query predicate, such as from one of the end user devices 104a-n. The query predicate can be associated with identification information of the user attempting to execute the query predicate. The query predicate can include a query involving one of the fine-grained privacy-preserving columns. The query predicate can be associated with identification information of the fine-grained privacy-preserving column. The query predicate can include operator information (e.g., one or more predicate operator(s)). In response to receiving the query predicate, the DBMS 108 can search the predicate catalog table to determine whether there is a first match between identification information and operator information in a first row of the predicate catalog table and information associated with the query predicate. For example, the DBMS 108 can search the predicate catalog table to determine whether there is a first row that has identification information and operator information corresponding to (e.g., identical to) the identification information and operator information, respectively, associated with the query predicate.

In embodiments, the DMBS 108 determines that there is a first match between identification information and operator information in the first row of the predicate catalog table and information associated with the query predicate. For example, the DMBS 108 can determine that the identification information and operator information in the first row correspond to (e.g., are identical to) the identification information and operator information, respectively, associated with the query predicate. If the DMBS 108 determines that there is a first match between the identification information and operator information in the first row of the predicate catalog table and information associated with the query predicate, the DMBS 108 can determine whether a value of a quantity limit in the first row is greater than zero.

If the value of the quantity limit in the first row is greater than zero, the DBMS 108 can cause execution of the query predicate. The DBMS 108 can automatically update the predicate catalog table in response to executing the query predicate. For example, the DBMS 108 can automatically reduce the value of the quantity limit in the first row by one in response to executing the query predicate. Conversely, if the value of the quantity limit in the first row is equal to zero, the DBMS 108 can refrain from executing the query predicate. If the DBMS 108 refrains from executing the query predicate, the DBMS 108 can cause output of an error message (e.g., via the device that attempted to execute the query predicate) indicating that the query predicate is not allowed.

In embodiments, automatically reducing the value of the quantity limit in the first row by one (e.g., in response to executing the query predicate) can reduce the value of the quantity limit in the first row to zero. If the DMBS 108 determines that the value of the quantity limit in the first row is reduced to zero, the DBMS 108 can determine whether an interval in the first row has a null value. If the interval in the first row has a null value, this can indicate that the quantity limit is never to be reset. As such, if the interval in the first row has a null value, the DBMS 108 can delete the first row from the predicate catalog table. Conversely, if the interval in the first row has a non-null value (e.g., one day, one week, etc.), the DBMS 108 can refrain from deleting the first row. The DBMS 108 can instead automatically reset the quantity limit in the first row at every interval in response to determining that the interval in the first row has a non-null value.

In embodiments, the DMBS 108 determines that there is not a first match between identification information and operator information in the first row of the predicate catalog table and information associated with the query predicate. The query predicate can include a specific (e.g., non-null) predicate operator. For example, the DBMS 108 can determine that the identification information and operator information in the first row do not correspond to (e.g., are not identical to) the identification information and operator information, respectively, associated with the query predicate.

If the DMBS 108 determines that there is not a first match between identification information and operator information in the first row of the predicate catalog table and information associated with the query predicate, the DBMS 108 can determine whether there is a second match between identification information in a second row of the predicate catalog table and the information associated with the query predicate. If the DBMS 108 determines that there is a second match between identification information in the second row of the predicate catalog table and the information associated with the query predicate, the DBMS 108 can determine whether operation information in the second row covers a plurality of predicate operators. The plurality of predicate operators can include the specific predicate operator. If the second row covers the plurality of predicate operators include the specific predicate operator, the operator information in the second row can have a null value.

If the DMBS 108 determines that the operation information in the second row covers the plurality of predicate operators (including the specific predicate operator), the DMBS 108 can determine whether a value of a quantity limit in the second row is greater than zero. If the value of the quantity limit in the second row is greater than zero, the DBMS 108 can cause execution of the query predicate. The DBMS 108 can automatically update the predicate catalog table in response to executing the query predicate. For example, the DBMS 108 can automatically reduce the value of the quantity limit in the second row by one in response to executing the query predicate. Conversely, if the value of the quantity limit in the second row is equal to zero, the DBMS 108 can refrain from executing the query predicate. If the DBMS 108 refrains from executing the query predicate, the DBMS 108 can cause output of an error message (e.g., via the device that attempted to execute the query predicate) indicating that the query predicate is not allowed.

In embodiments, the DMBS 108 determines that there is neither the first match nor the second match. For example, the DMBS 108 can determine that not a single row in the predicate catalog table contains identical identification information as the predicate query and either (i) identical operator information as the predicate query, or (ii) operator information that has a null value. The DBMS 108 can refrain from executing the query predicate in response to determining that neither the first match nor the second match is identified. If the DBMS 108 refrains from executing the query predicate, the DBMS 108 can cause output of an error message (e.g., via the device that attempted to execute the query predicate) indicating that the query predicate is not allowed.

Figure 2:
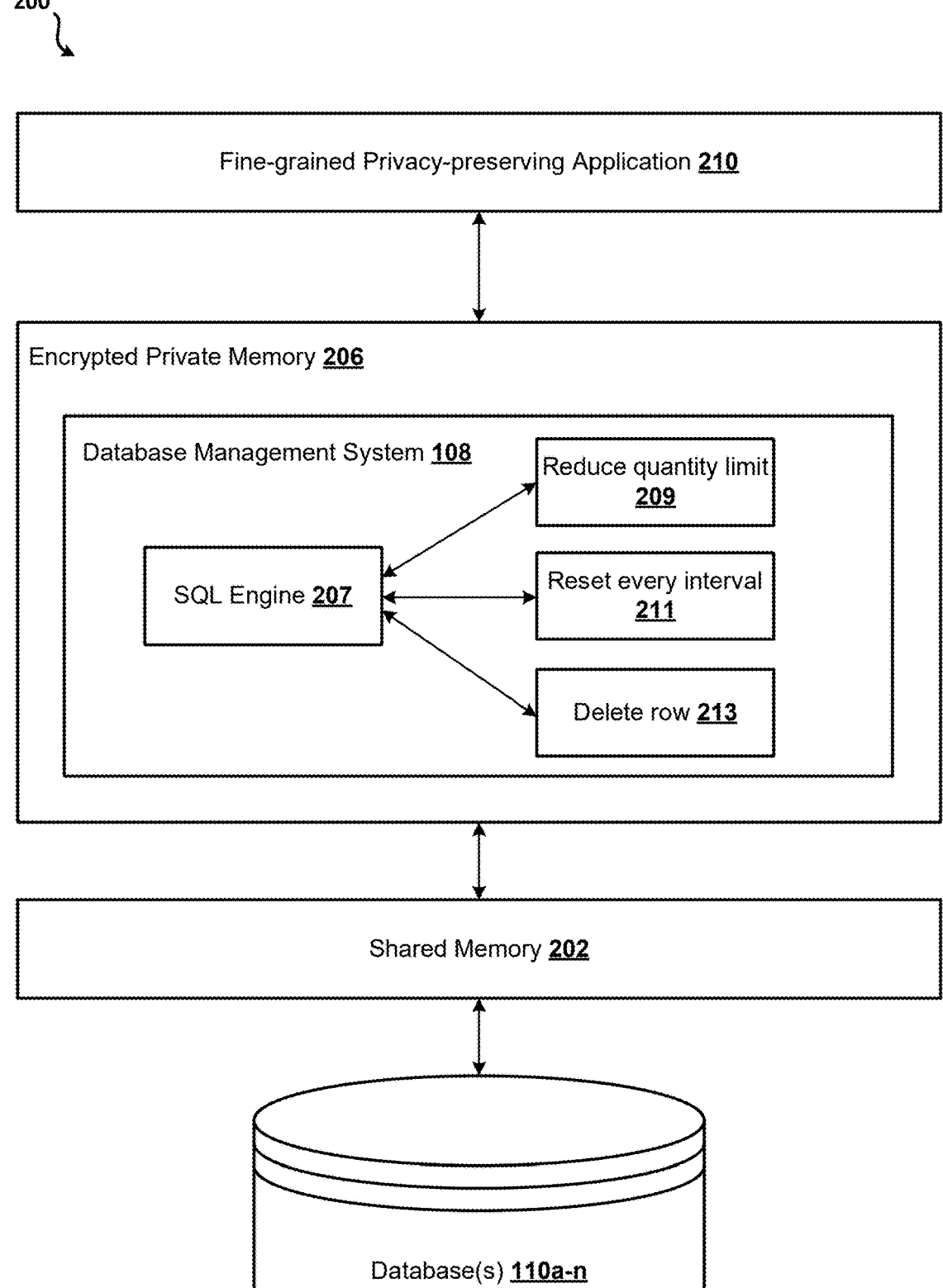
FIG. 2 shows an example system for processing query predicates involving fine-grained privacy-preserving columns in accordance with the present disclosure.

FIG. 2 shows an example system 200 for implementing multiple security levels of control over predicate access to fine-grained privacy-preserving columns in accordance with the present disclosure. The system 200 includes the DBMS 108 and the at least one database 110. The DBMS 108 can be contained in an encrypted private memory 206. The DBMS 108 can be in communication with the at least one database 110 via shared memory 202.

The DBMS 108 can support fine-grained privacy-preserving application(s) 210. To fulfill flexible data privacy, the fined-grained approach can be utilized to protect privacy at the column level. For example, an employee data table can contain sensitive information such as salary information. The DBMS 108 has to guarantee that no users other than human resource roles, including database administrators, can view the contents. The DBMS 108 can include a SQL engine 207. The SQL engine 207 can receive commands (e.g., SQL commands) from end users (e.g., from end-user devices 104a-n). In response to the commands received from the end users, the SQL engine 207 can reduce 209 a quantity limit in a row of the predicate catalog table 209, reset 211 a quantity limit in a row of the predicate catalog table at every interval, and delete 213 a row of the predicate catalog if the row contains a quantity limit of zero and a "null" interval.

The DBMS 108 can rely on a trust execution environment (TEE)-based virtual machine (VM) environment. The TEE-based VM environment can provide execution domain isolation by encryption of memory and registers, integrity measurement, and remote attestation to ensure data confidentiality. VM instances do not require additional development of a library operating system (OS) to support application workloads, thereby conserving engineering resources. Moreover, VM instances have the ability to fully utilize all CPU and memory resources available on a physical node. This advantage facilitates the management of large-memory workloads entirely within secure memory, minimizing I/O operations and boosting performance significantly.

Figure 3:
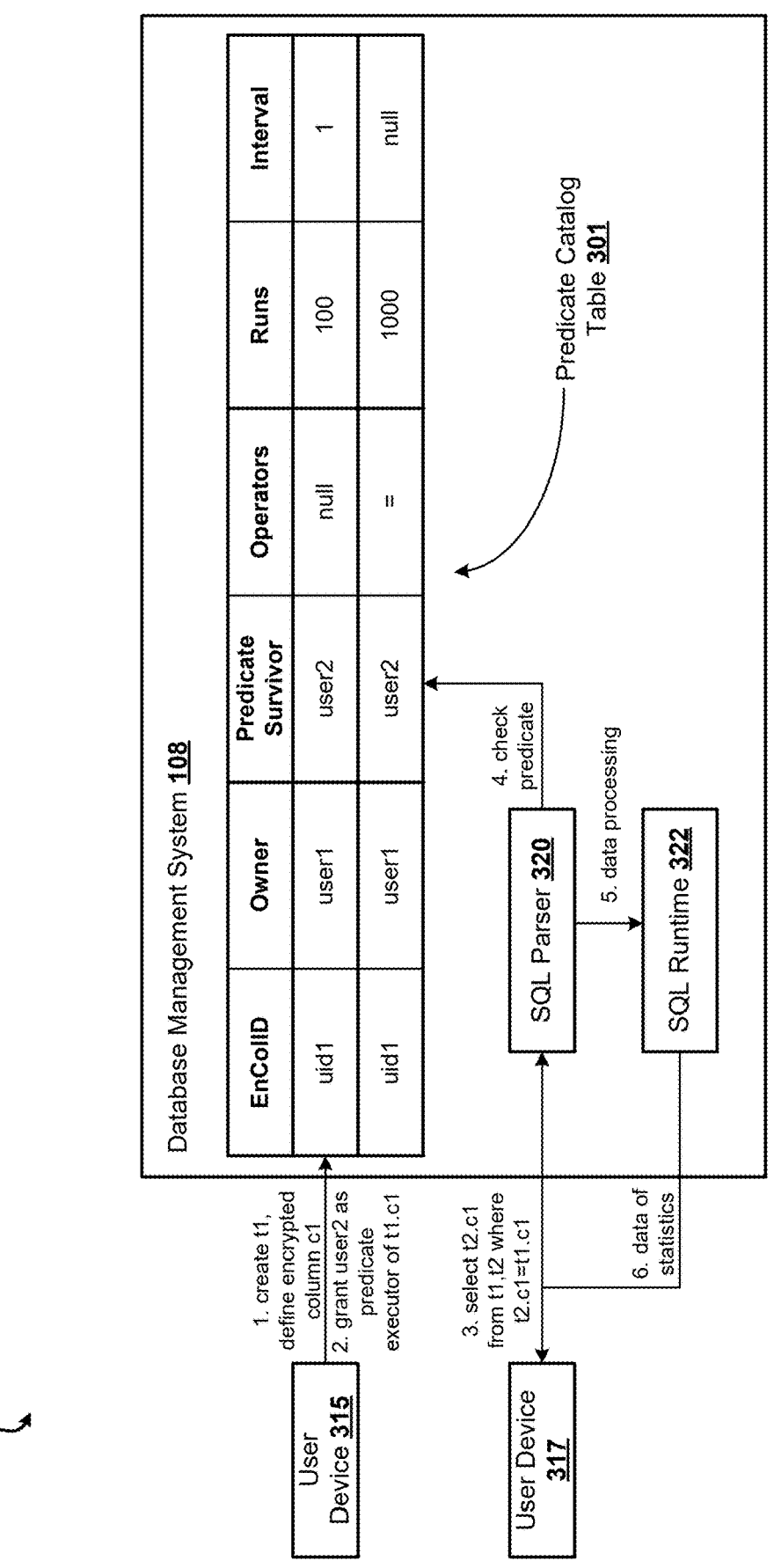
FIG. 3 shows an example system for processing query predicates involving fine-grained privacy-preserving columns in accordance with the present disclosure.

FIG. 3 shows an example system 300 for processing query predicates involving fine-grained privacy-preserving columns. The system 300 includes the DBMS 108, a first user device 315, and a second user device 317. The DBMS 108 includes the predicate catalog table 301, a SQL parser 320, and a SQL runtime 322.

At numeral 1, the DBMS 108 can create a table (e.g., table 1, not shown in FIG. 3) including a fine-grained privacy-preserving column. The fine-grained privacy-preserving column can include secret information. The DBMS 108 can create the table (e.g., table 1) including the fine-grained privacy-preserving column in one or more encrypted database(s). The DBMS 108 can create the table (e.g., table 1) including the fine-grained privacy-preserving column in response to receiving a command from the first user device 315. The first user device 315 can be associated with a first user (e.g., user1). The first user can be the owner of the fine-grained privacy-preserving column.

At numeral 2, the DBMS 108 can receive one or more instruction(s). The DBMS 108 can receive the instruction(s) from the first user device 315. The instruction(s) can include an instruction to grant a second user (e.g., user2) predicate access to the fine-grained privacy-preserving column. The second user (e.g., user2) can be associated with the second user device 317.

The instruction(s) can include identification information, such as identification information of the fine-grained privacy-preserving column (e.g., uid1) and identification information of the user to which the owner wants to grant predicate access (e.g., user2). The instruction(s) can include operator information indicating one or more predicate operators that user2 can use to query the fine-grained privacy-preserving column. The instruction(s) can include control information indicating a quantity limit that user2 is allowed to query the particular fine-grained privacy-preserving column using the one or more predicate operators (e.g., a quantity of times that the user is allowed to query the particular fine-grained privacy-preserving column using the one or more predicate operators). The control information in the instruction(s) can indicate an interval at which the quantity limit is to be reset (e.g., a time interval after which the quantity of times the user can run a query containing the predicate operator(s) is to be reset).

In the example of FIG. 3, the DBMS 108 can receive two different instructions from the first user device 315. The first instruction can grant the second user (e.g., user2) predicate access to the fine-grained privacy-preserving column using any operator (e.g., null operator value) with a quantity limit of 100 and an interval of 1. The second instruction can grant the second user (e.g., user2) predicate access to the fine-grained privacy-preserving column using a specific predicate operator (e.g., "=" or any other specific operator) with a quantity limit of 1000 and a "null" interval.

In response to receiving the instruction(s), the DBMS 108 can update the predicate catalog table 301. The DBMS 108 can update the predicate catalog table 301 based on inserting a new row into the table. The new row can include the information indicated by the instruction. Alternatively, in response to receiving the instruction, the DBMS 108 can update an existing row in the predicate catalog table 301 to include the information indicated by the instruction. After updating the predicate catalog table 301, the predicate catalog table 301 can contain at least the two rows shown in FIG. 3. A first row can correspond to the first instruction, while a second row can correspond to the second instruction.

At numeral 3, the SQL parser 320 can receive a query from the second user device 317. The query can include a specific predicate operator (e.g., "=" or any other specific operator). The query can include the following query, for example: select t2.c1 from t1,t2 where t2.c1=t1.c1. At numeral 4, the SQL parser 320 can search the predicate catalog table 301 in response to receiving the query from the second user device 317. The SQL parser 320 can search the predicate catalog table 301 to determine whether there is a match between identification information and operator information in a row of the predicate catalog table 301 and information associated with the query. For example, the SQL parser 320 can search the predicate catalog table 301 to determine if a row in the predicate catalog table 301 contains the identification information of the fine-grained privacy-preserving column (e.g., uid1), the identification information of the second user (e.g., user2), and the specific predicate operator indicated by the query.

At numeral 5, the query can be executed in response to identifying a row in the predicate catalog table 301 that contains the identification information of the fine-grained privacy-preserving column (e.g., uid1) owned by the first user (e.g., user1), the identification information of the second user (e.g., user2), and the specific predicate operator (e.g., "=") indicated by the query. The query in response to determining that the value of the quantity limit in the identified row is greater than zero. At numeral 6, the results of the query (e.g., the data of statistics associated with the query) can be returned to the second user device 317. The DMBS 108 can automatically reduce the value of the quantity limit in the row by one in response to executing the query.

FIG. 4 shows the example predicate catalog table 301. A DBMS (e.g., the DBMS 108) can create and automatically update the predicate catalog table 301 as predicate queries are processed. The predicate catalog table 301 can include a row 402. The row 402 can include identification information of the fine-grained privacy-preserving column (e.g., uid1), identification information of the owner (e.g., user1) of the fine-grained privacy-preserving column, and identification information of a user that has been granted predicate access (e.g., user2) to the fine-grained privacy-preserving column. The row 402 can include operator information indicating a specific predicate operator "=", or any other specific operator, that user2 can use to query the fine-grained privacy-preserving column. The row 402 can include a quantity limit "100," which indicates that number of times that user2 is allowed to query the fine-grained privacy-preserving column using the "=" predicate operator. The row 402 can include an interval "1," indicating that the quantity limit is to be reset to "100" after every internal (e.g., one day, one week, one month, etc.)

If user2 sends a command to execute query the fine-grained privacy-preserving column using the specific predicate operator, the predicate catalog table 301 can be searched to determine that there is a match between identification information and operator information in the row 402 of the predicate catalog table 301 and information associated with the query. For example, the predicate catalog table 301 can be searched to identify the row 402 containing the identification information of the fine-grained privacy-preserving column (e.g., uid1), the identification information of the user attempting to execute the predicate query (e.g., user2), and the specific predicate operator indicated by the query. The query can be executed in response to identifying the row 402. The query can be executed in response to determining that the value of the quantity limit in the row 402 is greater than zero. The quantity limit in the row 402 can be automatically reduced by one in response to executing the query.

FIG. 5 shows the example predicate catalog table 301. As described above with reference to FIG. 4, the predicate catalog table 301 can include the row 402. The predicate catalog table 301 can also include the row 502. The row 502 can include identification information of the fine-grained privacy-preserving column (e.g., uid1), identification information of the owner (e.g., user1) of the fine-grained privacy-preserving column, and identification information of the user that has been granted predicate access (e.g., user2) to the fine-grained privacy-preserving column. The row 502 can include operator information having a "null" value. A null predicate operator includes all available predicate operators, such as "=," ">," "<," "≤," "≥," "not in," "between," and/or any other operator. The row 502 can include a quantity limit "5," which indicates that number of times that user2 is allowed to query the fine-grained privacy-preserving column using any available predicate operator. The row 502 can include an interval "1," indicating that the quantity limit is to be reset to "5" after every internal (e.g., one day, one week, one month, etc.)

If user2 sends a command to execute query the fine-grained privacy-preserving column using the ">" predicate operator, the predicate catalog table 301 can be searched to determine that there is not a match between identification information and operator information in the row 402 of the predicate catalog table 301 and information associated with the query. For example, the predicate catalog table 301 can be searched to determine that the row 402 contains a specific predicate operator (e.g., "=" or any other specific operator) that does not match the predicate operator ">" in the query.

In response to determining that there is not a match between identification information and operator information in the row 402 of the predicate catalog table 301 and information associated with the query, the predicate catalog table 301 can be searched to determine that there is a match between identification information in the row 502 of the predicate catalog table 301 and the information associated with the query. For example, the predicate catalog table 301 can be searched to identify the row 502 containing the identification information of the fine-grained privacy-preserving column (e.g., uid1), the identification information of the user attempting to execute the predicate query (e.g., user2), and the null predicate operator (which includes the ">" predicate operator). The query can be executed in response to identifying the row 502. The query can be executed in response to determining that the value of the quantity limit in the row 502 is greater than zero. The quantity limit in the row 502 can be automatically reduced by one in response to executing the query.

FIG. 6 shows the example predicate catalog table 301. The predicate catalog table 301 can include a row 602. The row 602 can include identification information of the fine-grained privacy-preserving column (e.g., uid1), identification information of the owner (e.g., user1) of the fine-grained privacy-preserving column, and identification information of a user that has been granted predicate access (e.g., user2) to the fine-grained privacy-preserving column. The row 602 can include operator information indicating a specific predicate operator "=," or any other specific operator, that user2 can use to query the fine-grained privacy-preserving column. The row 602 can include a quantity limit "50," which indicates that number of times that user2 is allowed to query the fine-grained privacy-preserving column using the specific predicate operator. The row 602 can include a "null" interval, indicating that the quantity limit is never to be reset. If user2 executes 50 queries on the fine-grained privacy-preserving column using the specific predicate operator, the quantity limit in the row 602 can be automatically reduced to zero. If the quantity limit in the row 602 is reduced to zero, the row 602 can be automatically deleted from the predicate catalog table 301.

FIG. 7 shows the example predicate catalog table 301. The predicate catalog table 301 can include a row 702. The row 702 can include identification information of the fine-grained privacy-preserving column (e.g., uid1), identification information of the owner (e.g., user1) of the fine-grained privacy-preserving column, and identification information of a user that has been granted predicate access (e.g., user2) to the fine-grained privacy-preserving column. The row 702 can include operator information indicating a specific predicate operator "=," or any other specific operator, that user2 can use to query the fine-grained privacy-preserving column. The row 702 can include a quantity limit "30," which indicates that number of times that user2 is allowed to query the fine-grained privacy-preserving column using the specific predicate operator. The row 702 can include an interval "1," indicating that the quantity limit is to be reset to "30" after every internal (e.g., one day, one week, one month, etc.)

If user2 executes 30 queries on the fine-grained privacy-preserving column using the specific predicate operator, the quantity limit in the row 702 can be automatically reduced to zero. If the quantity limit in the row 702 is reduced to zero, user2 cannot execute any more queries on the fine-grained privacy-preserving column using the specific predicate operator until the quantity limit is reset. After the interval of "1" has lapsed (e.g., after one day, one week, one month, etc.), the quantity limit in the row 702 can be reset to "30." If the quantity limit in the row 702 can be reset to "30" the user can execute up to 30 more queries on the fine-grained privacy-preserving column using the specific predicate operator. This process of resetting the quantity limit in the row 702 can be repeated indefinitely.

FIG. 8 illustrates an example process 800 for processing query predicates involving fine-grained privacy-preserving columns. Although depicted as a sequence of operations in FIG. 8, those of ordinary skill in the art will appreciate that various embodiments may add, remove, reorder, or modify the depicted operations.

At 802, a query predicate can be received. The query predicate can involve a fine-grained privacy-preserving column. The fine-grained privacy-preserving column can contain secret information. The query predicate can be associated with identification information of the fine-grained privacy-preserving column. The query predicate can include operator information (e.g., one or more predicate operator(s)).

At 804, a predicate catalog table (e.g., predicate catalog table 301) can be searched. The predicate catalog table can be searched to determine whether there is a first match between identification information and operator information in a first row of the predicate catalog table and information associated with the query predicate. Each row of the predicate catalog table can include identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset.

At 806, it can be determined whether a value of a quantity limit in the first row is greater than zero. It can be determined whether the value of the quantity limit in the first row is greater than zero in response to determining that there is the first match between the identification information and the operator information in the first row and the information associated with the query predicate. At 808, the query predicate can be executed. The query predicate can be executed in response to determining that the value of the quantity limit in the first row is greater than zero. At 810, the predicate catalog table can be automatically updated. The predicate catalog table can be automatically updated in response to executing the query predicate. Automatically updating the predicate catalog table can include automatically reducing the value of the quantity limit in the first row by one.

FIG. 9 illustrates an example process 900 for processing query predicates involving fine-grained privacy-preserving columns. Although depicted as a sequence of operations in FIG. 9, those of ordinary skill in the art will appreciate that various embodiments may add, remove, reorder, or modify the depicted operations.

A query predicate can be executed. The query predicate can be executed in response to determining that the value of the quantity limit in a first row is greater than zero. At 902, a predicate catalog table (e.g., predicate catalog table 301) can be automatically updated. The predicate catalog table can be automatically updated in response to executing the query predicate. Automatically updating the predicate catalog table can include automatically reducing the value of the quantity limit in the first row by one.

At 904, it can be determined whether the value of the quantity limit in the first row is reduced to zero. If the value of the quantity limit in the first row has been reduced to zero, the interval in the first row can be determined. At 906, it can be determined whether an interval in the first row has a null value. It can be determined whether an interval in the first row has a null value in response to determining that the value of the quantity limit in the first row is reduced to zero. If the interval in the first row has a null value, this can indicate that the quantity limit is never to be reset. At 908, the first row from the predicate catalog table can be deleted. The first row can be deleted from the predicate catalog table in response to determining that the interval in the first row has the null value.

FIG. 10 illustrates an example process 1000 for processing query predicates involving fine-grained privacy-preserving columns. Although depicted as a sequence of operations in FIG. 10, those of ordinary skill in the art will appreciate that various embodiments may add, remove, reorder, or modify the depicted operations.

A query predicate can be executed. The query predicate can be executed in response to determining that the value of the quantity limit in a first row is greater than zero. At 1002, a predicate catalog table (e.g., predicate catalog table 301) can be automatically updated. The predicate catalog table can be automatically updated in response to executing the query predicate. Automatically updating the predicate catalog table can include automatically reducing the value of the quantity limit in the first row by one. At 1004, it can be determined whether the value of the quantity limit in the first row is reduced to zero. If the value of the quantity limit in the first row has been reduced to zero, the interval in the first row can be determined. At 1006, it can be determined whether an interval in the first row has a null value. It can be determined whether an interval in the first row has a null value in response to determining that the value of the quantity limit in the first row is reduced to zero. If the interval in the first row has a non-null value, this can indicate that the quantity limit is to be reset at every interval. At 1008, the quantity limit in the first row can be automatically reset at every interval in response to determining that the interval in the first row has a non-null value.

FIG. 11 illustrates an example process 1100 for processing query predicates involving fine-grained privacy-preserving columns. Although depicted as a sequence of operations in FIG. 11, those of ordinary skill in the art will appreciate that various embodiments may add, remove, reorder, or modify the depicted operations.

At 1102, a query predicate can be received. The query predicate can involve a fine-grained privacy-preserving column. The fine-grained privacy-preserving column can contain secret information. The query predicate can be associated with identification information of the fine-grained privacy-preserving column. The query predicate can include operator information (e.g., one or more predicate operator(s)). At 1104, it can be determined whether a value of a quantity limit in the first row is equal to zero. It can be determined whether the value of the quantity limit in the first row is equal to zero in response to determining that there is the first match between the identification information and the operator information in the first row and the information associated with the query predicate. The interval in the first row can have a non-null value. At 1106, the query predicate can be refrained from being executed. The query predicate can be refrained from being executed in response to determining that the value of the quantity limit in the first row is equal to zero. At 1108, an error message indicating that the query predicate is not allowed can be output. The error message indicating that the query predicate is not allowed can be output in response to refraining from executing the query predicate.

FIG. 12 illustrates an example process 1200 for processing query predicates involving fine-grained privacy-preserving columns. Although depicted as a sequence of operations in FIG. 12, those of ordinary skill in the art will appreciate that various embodiments may add, remove, reorder, or modify the depicted operations.

At 1202, a query predicate can be received. The query predicate can involve a fine-grained privacy-preserving column. The fine-grained privacy-preserving column can contain secret information. The query predicate can be associated with identification information of the fine-grained privacy-preserving column. The query predicate can include a specific predicate operator.

At 1204, a predicate catalog table (e.g., predicate catalog table 301) can be searched. Each row of the predicate catalog table can include identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset. The predicate catalog table can be searched to determine whether there is a second match between identification information in a second row of the predicate catalog table and information associated with the query predicate.

At 1206, it can be determined whether operation information in the second row covers a plurality of predicate operators including the specific predicate operator. It can be determined whether operation information in the second row covers a plurality of predicate operators including the specific predicate operator in response to determining the second match between the identification information in the second row and the information associated with the query predicate. At 1208, the query predicate can be executed. The query predicate can be executed in response to determining that the operation information in the second row covers the specific predicate operator. The query predicate can be executed in response to determining that the value of a quantity limit in the second row is greater than zero. At 1210, the predicate catalog table can be automatically updated. The predicate catalog table can be automatically updated in response to executing the query predicate. Automatically updating the predicate catalog table can include automatically reducing the value of the quantity limit in the second row by one.

FIG. 13 illustrates an example process 1300 for processing query predicates involving fine-grained privacy-preserving columns. Although depicted as a sequence of operations in FIG. 13, those of ordinary skill in the art will appreciate that various embodiments may add, remove, reorder, or modify the depicted operations.

At 1302, a query predicate can be received. The query predicate can involve a fine-grained privacy-preserving column. The fine-grained privacy-preserving column can contain secret information. The query predicate can be associated with identification information of the fine-grained privacy-preserving column. The query predicate can include operator information (e.g., one or more predicate operator(s)). The query predicate can include a specific predicate operator.

At 1304, a predicate catalog table (e.g., predicate catalog table 301) can be searched. The predicate catalog table can be searched to determine whether there is a first match between identification information and operator information in a first row of the predicate catalog table and information associated with the query predicate. Each row of the predicate catalog table can include identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset.

At 1306, the predicate catalog table can be searched to determine whether there is a second match between identification information in a second row of the predicate catalog table and information associated with the query predicate.

The predicate catalog table can be searched to determine whether there is a second match between identification information in the second row of the predicate catalog table and information associated with the query predicate in response to determining that the first match does not exist.

At 1308, the query predicate can be refrained from being executed. The query predicate can be refrained from being executed in response to determining that neither first match nor the second match is identified. At 1310, an error message indicating that the query predicate is not allowed can be output. The error message indicating that the query predicate is not allowed can be output in response to refraining from executing the query predicate.

Figure 14:
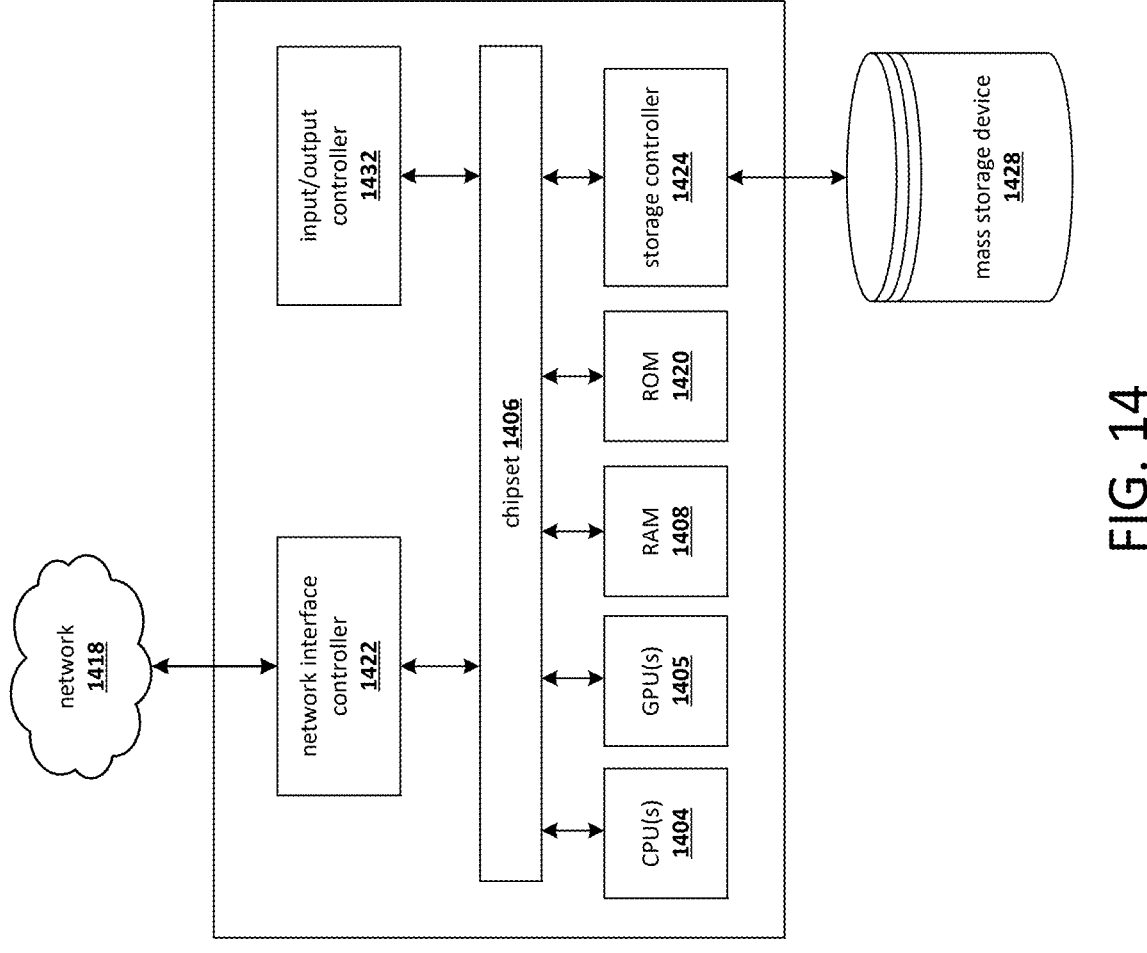
FIG. 14 shows an example computing device which may be used to perform any of the techniques disclosed herein.

FIG. 14 illustrates a computing device that may be used in various aspects, such as the model(s), components, and/or devices depicted in FIGS. 1-3. With regard to FIGS. 1-3, any or all of the components may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of processing query predicates involving fine-grained privacy-preserving columns, comprising:
receiving a query predicate involving a fine-grained privacy-preserving column, wherein the fine-grained privacy-preserving column contains secret information;
searching a predicate catalog table and determining whether there is a first match between identification information and operator information in a first row of the predicate catalog table and information associated with the query predicate, wherein each row of the predicate catalog table comprises identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset;
determining whether a value of a quantity limit in the first row is greater than zero in response to determining that there is the first match between the identification information and the operator information in the first row and the information associated with the query predicate;
executing the query predicate in response to determining that the value of the quantity limit in the first row is greater than zero; and
automatically reducing the value of the quantity limit in the first row by one and automatically updating the predicate catalog table.

2. The method of claim 1, further comprising:
determining whether the value of the quantity limit in the first row is reduced to zero; and
determining whether an interval in the first row has a null value in response to determining that the value of the quantity limit in the first row is reduced to zero.

3. The method of claim 2, further comprising:
deleting the first row from the predicate catalog table in response to determining that the interval in the first row has the null value.

4. The method of claim 2, further comprising:
automatically resetting the quantity limit in the first row at every interval in response to determining that the interval in the first row has a non-null value.

5. The method of claim 1, further comprising:
refraining from executing the query predicate in response to determining that the value of the quantity limit in the first row is equal to zero, wherein the interval in the first row has a non-null value; and
causing output of an error message indicating that the query predicate is not allowed.

6. The method of claim 1, wherein the query predicate comprises a specific predicate operator, and wherein the method further comprises:
determining whether there is a second match between identification information in a second row of the predicate catalog table and the information associated with the query predicate in response to determining the first match is not identified; and
determining whether operation information in the second row covers a plurality of predicate operators including the specific predicate operator in response to determining there is the second match between the identification information in the second row and the information associated with the query predicate.

7. The method of claim 6, further comprising:
executing the query predicate in response to determining that the operation information in the second row covers the specific predicate operator and determining that a value of a quantity limit in the second row is greater than zero; and
automatically reducing the value of the quantity limit in the second row by one.

8. The method of claim 6, further comprising:
refraining from executing the query predicate in response to determining that neither the first match nor the second match is identified; and
causing output of an error message indicating that the query predicate is not allowed.

9. A system of processing query predicates involving fine-grained privacy-preserving columns, comprising:
at least one processor; and
at least one memory communicatively coupled to the at least one processor and comprising computer-readable instructions that upon execution by the at least one processor cause the at least one processor to perform operations comprising:
receiving a query predicate involving a fine-grained privacy-preserving column, wherein the fine-grained privacy-preserving column contains secret information;
searching a predicate catalog table and determining whether there is a first match between identification information and operator information in a first row of the predicate catalog table and information associated with the query predicate, wherein each row of the predicate catalog table comprises identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset;
determining whether a value of a quantity limit in the first row is greater than zero in response to determining that there is the first match between the identification information and the operator information in the first row and the information associated with the query predicate;

executing the query predicate in response to determining that the value of the quantity limit in the first row is greater than zero; and automatically reducing the value of the quantity limit in the first row by one and automatically updating the predicate catalog table.

10. The system of claim 9, the operations further comprising:

determining whether the value of the quantity limit in the first row is reduced to zero; and determining whether an interval in the first row has a null value in response to determining that the value of the quantity limit in the first row is reduced to zero.

11. The system of claim 10, the operations further comprising:

deleting the first row from the predicate catalog table in response to determining that the interval in the first row has the null value; or automatically resetting the quantity limit in the first row at every interval in response to determining that the interval in the first row has a non-null value.

12. The system of claim 9, the operations further comprising:

refraining from executing the query predicate in response to determining that the value of the quantity limit in the first row is equal to zero, wherein the interval in the first row has a non-null value; and causing output of an error message indicating that the query predicate is not allowed.

13. The system of claim 9, wherein the query predicate comprises a specific predicate operator, and wherein the operations further comprise:

determining whether there is a second match between identification information in a second row of the predicate catalog table and the information associated with the query predicate in response to determining the first match is not identified; and determining whether operation information in the second row covers a plurality of predicate operators including the specific predicate operator in response to determining there is the second match between the identification information in the second row and the information associated with the query predicate.

14. The system of claim 13, the operations further comprising:

executing the query predicate in response to determining that the operation information in the second row covers the specific predicate operator and determining that a value of a quantity limit in the second row is greater than zero; and automatically reducing the value of the quantity limit in the second row by one.

15. The system of claim 13, the operations further comprising:

refraining from executing the query predicate in response to determining that neither the first match nor the second match is identified; and causing output of an error message indicating that the query predicate is not allowed.

16. A non-transitory computer-readable storage medium, storing computer-readable instructions that upon execution by a processor cause the processor to implement operations comprising:

receiving a query predicate involving a fine-grained privacy-preserving column, wherein the fine-grained privacy-preserving column contains secret information;

searching a predicate catalog table and determining whether there is a first match between identification information and operator information in a first row of the predicate catalog table and information associated with the query predicate, wherein each row of the predicate catalog table comprises identification information identifying a particular fine-grained privacy-preserving column and a particular predicate survivor user, operator information indicating one or more predicate operators, a quantity limit that the particular predicate survivor user is allowed to query the particular fine-grained privacy-preserving column using the one or more predicate operators, and an interval at which the quantity limit is to be reset;

determining whether a value of a quantity limit in the first row is greater than zero in response to determining that there is the first match between the identification information and the operator information in the first row and the information associated with the query predicate;

executing the query predicate in response to determining that the value of the quantity limit in the first row is greater than zero; and automatically reducing the value of the quantity limit in the first row by one and automatically updating the predicate catalog table.

17. The non-transitory computer-readable storage medium of claim 16, the operations further comprising:

determining whether an interval in the first row has a null value in response to determining that a value of the quantity limit in the first row is reduced to zero; and deleting the first row from the predicate catalog table in response to determining that the interval in the first row has the null value; or automatically resetting the quantity limit in the first row at every interval in response to determining that the interval in the first row has a non-null value.

18. The non-transitory computer-readable storage medium of claim 16, the operations further comprising:

refraining from executing the query predicate in response to determining that the value of the quantity limit in the first row is equal to zero, wherein the interval in the first row has a non-null value; and causing output of an error message indicating that the query predicate is not allowed.

19. The non-transitory computer-readable storage medium of claim 16, wherein the query predicate comprises a specific predicate operator, and wherein the operations further comprise:

determining whether there is a second match between identification information in a second row of the predicate catalog table and the information associated with the query predicate in response to determining the first match is not identified; and determining whether operation information in the second row covers a plurality of predicate operators including the specific predicate operator in response to determining there is the second match between the identification information in the second row and the information associated with the query predicate.

20. The non-transitory computer-readable storage medium of claim 19, the operations further comprising:

executing the query predicate in response to determining that the operation information in the second row covers the specific predicate operator and determining that a value of a quantity limit in the second row is greater than zero; and automatically reducing the value of the quantity limit in the second row by one.

* * * * *